Nov. 15, 1960 J. A. SMYSER 2,960,130
TIRE SUPPORTING AND INFLATING APPARATUS
Filed Aug. 19, 1957 2 Sheets-Sheet 1

JAMES A. SMYSER
INVENTOR
HUEBNER, BEEHLER & WORREL
ATTORNEYS
BY Richard M. Worrel

JAMES A. SMYSER
INVENTOR
HUEBNER, BEEHLER & WORREL
ATTORNEYS

United States Patent Office 2,960,130
Patented Nov. 15, 1960

2,960,130
TIRE SUPPORTING AND INFLATING APPARATUS

James A. Smyser, 714 E St., Taft, Calif.

Filed Aug. 19, 1957, Ser. No. 678,840

12 Claims. (Cl. 144—288)

The present invention relates to tire mounting and inflating apparatus and more particularly to such an apparatus including an expansible rim, means for expanding and contracting the rim, and means for inflating and deflating the tire synchronously or independently with rim expansion and contraction.

It is usually necessary to mount a tire in inflated position while performing such tasks as buffing, grinding, smoothing and dressing preparatory to recapping or retreading the tire. Although at one time tires were held in such position by employing inner tubes inflated in the usual manner, more recently apparatus has been known for mounting and inflating tires in work positions without inner tubes. It is to be noted that when used hereinafter, the expression "tubeless tire" is intended to refer to both those tires normally employing inner tubes but having such tubes removed as well as to those tires which normally do not use an inner tube.

In my prior copending United States patent application Serial No. 660,572, filed May 21, 1957, for A Tire Mounting Apparatus, of which the present application is a continuation-in-part, there is disclosed an apparatus for mounting a tubeless tire in a work position which enables its inflation in such position. Such apparatus is obviously suited to mounting and inflation of tires for work thereon as well as for use in supporting vehicles. Briefly, this apparatus includes an expansible rim having a plurality of arcuate, separable rim segments mounted in concentric circumscribing relation to a predetermined axis for radial movement between an inner retracted rim forming position in continuous annular arrangement and an outer rim forming position with the segments in end-to-end spaced relation. Further, the apparatus provides an annular endless elastic band of resiliently flexible and compressible air impervious material fitted in circumscribing relation to the rim segments and yieldably urging the segments into their retracted positions. The rim segments are adapted to mount a tubeless tire in circumscribing relation thereon with the beads of the tire in engagement with the band. Means are provided for expanding and contracting the rim segments thereby to enable mounting and dismounting of the tire. Further, means are provided for enabling inflation of the tire when the rim segments are expanded and the beads are in airtight engagement with the band.

The subject invention relates to further advancements in the general structure discussed in the preceding paragraph and more particularly to improved means for expanding and contracting the rim segments as well as to uniquely coactive means for inflating the tire.

Accordingly, it is an object of the present invention to provide an apparatus for mounting a tire thereon for inflation purposes.

Another object in a tire mounting apparatus including an expansible rim is to enable simultaneous expansion of the rim and inflation of a tire mounted on the rim as well as simultaneous contraction of the rim and deflation of the tire.

Another object is to provide means for expanding and contracting a rim including a plurality of separable rim segments.

Another object is to enable the rapid and convenient attachment, removal and/or replacement of an elastic band on the separable rim segments of an expansible rim.

Another object is to minimize the expense, labor, and difficulty of preparing tires to be recapped.

Another object is to provide a device for mounting a tubeless tire in a work position in inflated condition to enable buffing, dressing, grinding, or other resurfacing tasks.

Other objects are to provide a tire mounting and inflating apparatus of the nature described which is economical to construct and operate, dependable in operation, durable in construction, and which is highly effective for accomplishing its intended purposes.

These, together with other objects, will become more fully apparent upon reference to the following description and accompanying drawing.

Figure 1:
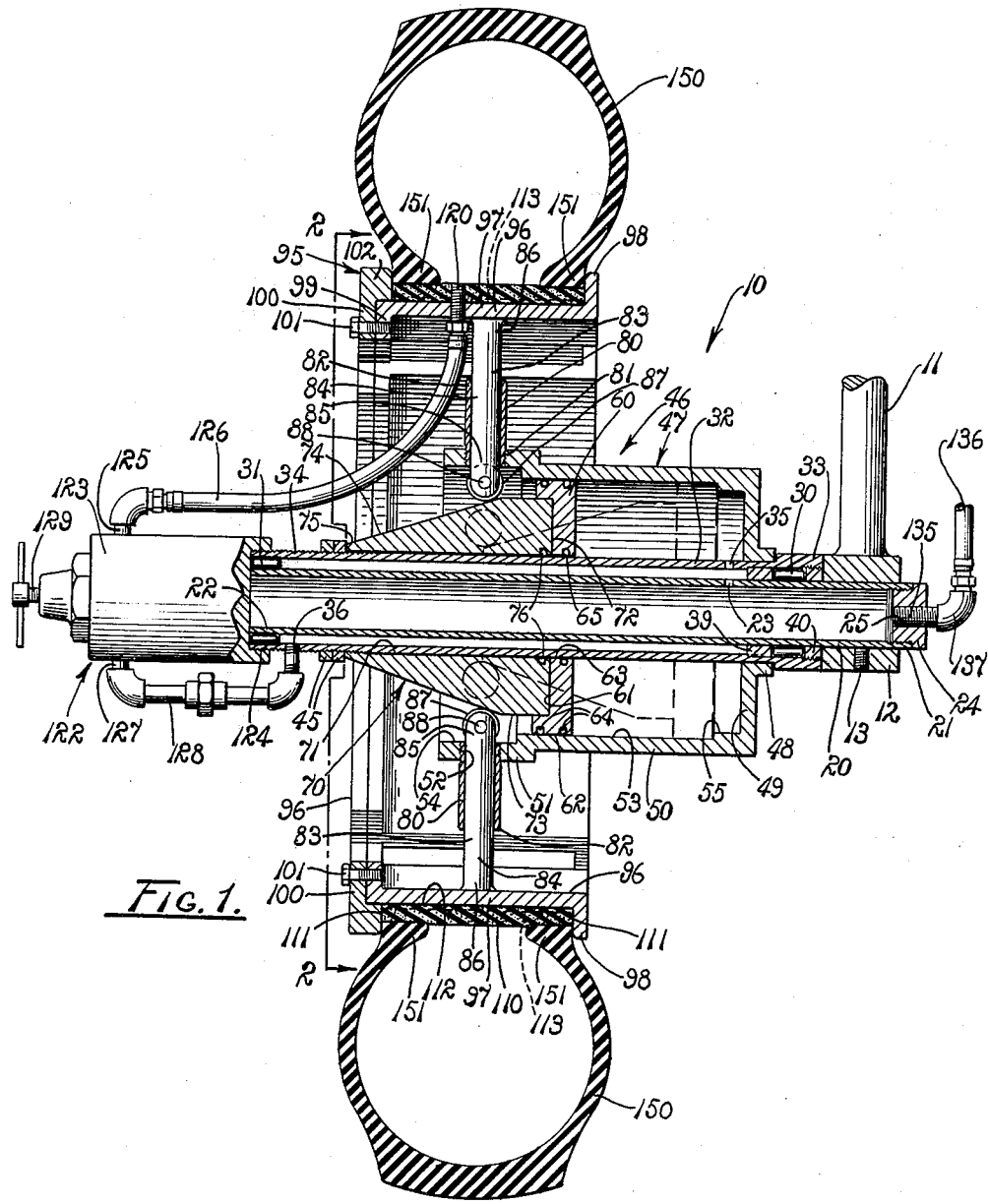
Fig. 1 is a longitudinal, vertical cross section taken through the apparatus of the present invention and showing a tire mounted in inflated condition on the apparatus.

Referring more particularly to the drawing, a tire mounting and inflating apparatus embodying the principles of the present invention is generally indicated by the numeral 10. The apparatus provides a dependent support arm 11 terminating in an annular collar 12 providing a horizontal bore. A setscrew 13 is radially screw-threaded through the collar into the bore.

An elongated cylindrical inside tube 20 provides a support end 21 having internal threads and being rigidly received in the collar 12. The tube is mounted in a horizontal position by the arm and has an extended end 22. The tube has a radial air passage 23 adjacent to the support end. The support end of the tube is closed by means of a plug 24 screw-threaded therein and including a bore 25 coaxial with the tube.

Bearings 30 and 31 are mounted in circumscribing relation on the opposite ends 21 and 22 of the tube. An elongated cylindrical outside sleeve 32 is rotatably journaled in concentric circumferentially spaced relation on the tube 20 by means of the bearings and provides support and extended ends 33 and 34 respectively adjacent to the support and extended ends 21 and 22 of the tube. The support end of the sleeve provides an enlarged head terminating in internal threads. Further, the sleeve has an aperture 35 adjacent to and preferably radially aligned with the air passage 23 in the tube 20, and a radially extended perforation 36 adjacent to the extended end 34. The extended end is also provided with external threads.

The support end 33 of the outside sleeve 32 has an internal recess in which is mounted an annular packing gland 39 circumscribing the tube 20 and inwardly engaging the bearings 30. An annular nut 40 is screw-threadably mounted in the terminus of the support end 33 and also abuts the bearing 30 outwardly thereof.

A pair of annular stops 45 are screw-threaded on the sleeve 32 and are positioned adjacent to the extended end 34 of the sleeve. A pneumatic ram 46 includes an air cylinder 47 having an annular neck 48 rigidly mounted around the sleeve 32 against the enlarged support end 33, a radial closed end wall 49, and an extended cylindrical wall 50 in spaced circumscribing concentric relation to the sleeve. The cylindrical wall includes a diametrically enlarged extended portion 51 terminating in an open end for the cylinder and providing a plurality of radial openings 52, in substantially equally spaced relation circumferentially of the cylinder. The cylindrical wall also has an inner surface 53 providing an outer enlarged area 54 within the enlarged portion 51 and an inner diametrically reduced area 55 adjacent to the closed end wall.

An annular piston 60 is slidably fitted on the sleeve 32 within the cylinder 47 for longitudinal slidable movement on the sleeve between a retracted position in spaced relation to the end wall 49 and an extended position adjacent to the outer enlarged portion 51 of the cylinder. The piston has an outwardly disposed annular end recess 61, an outer surface 62 slidably engaging the inner surface 53 of the cylindrical wall 50, and an inner surface 63 slidably engaging the sleeve. O-rings 64 and 65 are fitted in grooves provided for the purpose in the inner and outer surfaces of the piston.

An elongated camming block 70 provides an inner cylindrical bore 71 longitudinally slidably fitted on the sleeve 32, a radial end wall 72 frictionally fitted in the recess 61 of the piston 60 so as to connect the block to the piston, an outer cylindrical surface 73 of predetermined maximum diameter, and a frusto-conical surface 74 tapered from said cylindrical surface endwardly of the block to an abutment nose or end 75 of minimum diameter. An O-ring 76 is fitted in a groove in the bore 61 for slidable engagement with the sleeve. The block is thus adapted for reciprocal slidable movement along the sleeve with the piston between an extended position wherein the nose is in abutment with one of the stops 45, as shown in full lines in Fig. 1, and a retracted position within the cylinder 47, as indicated in dashed lines in Fig. 1.

Elongated cylindrical guides 80 provide inner threaded ends 81 individually screw-threadedly fitted in the radial openings 52 of the cylinder 47 and outer ends 82 radially outwardly extended from the cylinder. Plungers 83 including plunger rods 84 are individually slidably fitted in the guides for movement inwardly and outwardly of the cylinder and have inner ends 85 and outer ends 86. The plungers also provide rollers 87 rotatably mounted by means of pins 88 on the inner ends 85 of the rods for rotation about axes in a common plane transversely normal to the sleeve 32. The rollers are in engagement with the camming surface 74 of the camming block 70 whereby the plungers are moved between their inner and outer positions incident to longitudinal movement of the block and the sleeve, as best visualized by reference to Fig. 1.

An expansible rim 95 includes a plurality of separable, arcuate, Z-shaped rim segments 96 each including a central web 97, a radially outwardly directed flange 98 and a radially inwardly directed flange 99. The rim segments also include L-shaped brackets 100 individually connected to the inwardly directed flanges by means of bolts 101 and providing outwardly directed flanges 102 in spaced parallel relation to the outwardly directed flanges 98. The rim segments are individually rigidly secured to the outer ends 86 of the plunger rods 84 in concentric circumscribing relation to the sleeve 32 for movement with the plungers 83 between contracted inner positions in end-to-end abutment so as to form a substantially continuous annulus and radially outwardly expanded positions in end-to-end spaced relation but still in form of an annulus.

Figure 2:
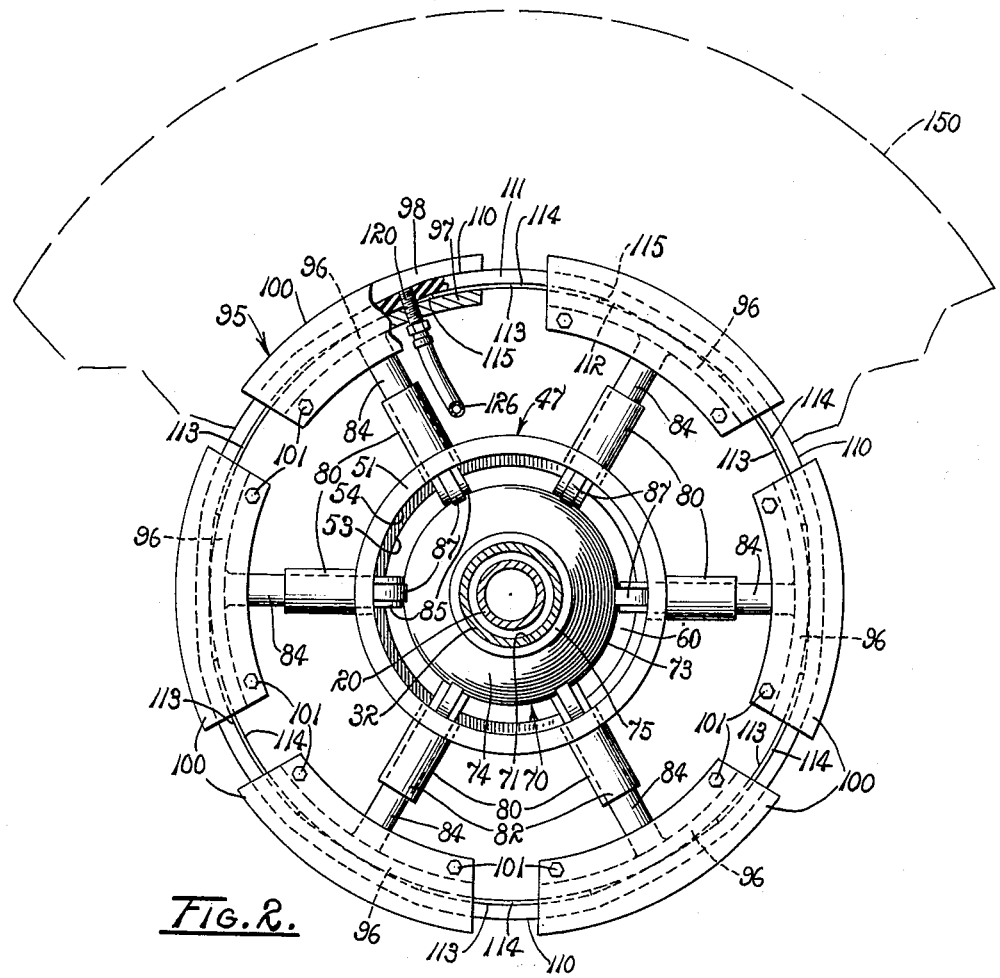
Fig. 2 is a transverse section taken on line 2—2 of Fig. 1 with a portion thereof broken away and in cross section to show the manner in which air is admitted to a tire fragmentarily indicated in dashed lines, mounted on the apparatus.

An endless annular elastic band 110 is resiliently compressible air impervious rubber, plastic or other material is fitted in circumscribing relation on the rim 95 having annular edges 111 engaging the flanges 98 and 102 and an inwardly disposed surface 112 engaging the webs 97. A plurality of resiliently flexible bridging plates 113 are secured to the inwardly disposed surface of the band in slidable engagement with the webs and in bridging relation to adjacent rim segments 96, as best seen in Fig. 2. The bridging plates provide longitudinal edges 114 engaging the flanges of the segments and transverse edges 115 in spaced relation circumferentially of the rim. If desired, the plates may each have an end secured to one of their respectively overlapped rim segments while slidably engaging their respective opposite overlapped rim segments so as to be held in bridging position without being secured to the band 110.

As best seen in Figs. 1 and 2, an air conducting nipple 120 is extended through the web 97 of one of the rim segments 96 and through the band 110 so as to provide for passage of air from the outwardly disposed surface of the band to the inwardly disposed surface of the web. An air pressure regulator is generally indicated by the numeral 122 and provides a housing 123 having an internally threaded socket 124 screw-threaded on the extended end 34 of the sleeve 32 in closing relation to both of the extended ends 22 and 34 of the tube 20 and the sleeve. The regulator is secured to the sleeve for rotation therewith and it is to be noted that the regulator rotates relative to the tube. The regulator includes an air duct 125 connected to the nipple 120 by means of a flexible hose 126, and a supply duct 127 connected to the sleeve 32 by means of a conduit 128 having an end connected to the supply duct and an opposite end screw-threaded into the perforation 36 in the sleeve. The regulator may be of any well-known conventional type adapted to provide a predetermined air pressure at the tire duct 125 regardless of the extent of excess air pressure at the supply duct 127. An adjustment screw 129 is also provided in the regulator for adjusting the predetermined pressure at the tire duct.

A nipple 135 is screw-threaded into the bore 25 of the plug 24, and an air supply hose 136 is connected to the nipple by means of an elbow 137.

Figure 3:
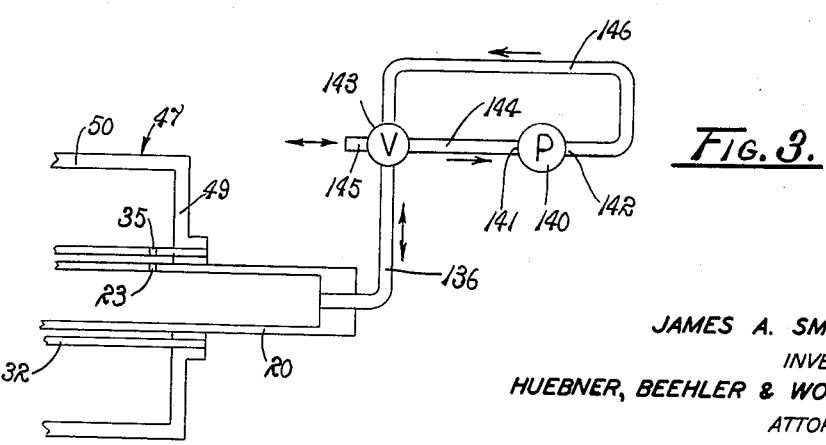
Fig. 3 is a fragmentary diagrammatic view of an air system employed with the present invention.

Referring particularly to Fig. 3, an air system as provided by the present invention includes an air pump 140 having an intake 141 and an outlet 142. The system also provides a two position valve 143. The valve has a port connected to the intake of the pump by means of an air line 144. The supply hose 136 is connected to another port of the valve. Still further, the valve has an atmosphere port 145, and an air line 146 connects a fourth port of the valve to the output 142 of the pump. In an expand position of the valve, the pump outlet is connected to the supply hose 136 while the pump intake is connected to the atmosphere port 145. In a contract position of the valve, the pump outlet is connected to the atmosphere port while the pump intake is connected to the supply hose.

Operation

The operation of the described embodiment of the subject invention is believed to be readily apparent and is briefly summarized at this point.

The arm 11 is preferably mounted in suitable structure, not shown, enabling 360° rotation thereof around a vertical concentric axis. With the rim 95 contracted, that is with the camming block 70 in retracted position within the cylinder 47, a tire 150 having annular beads 151 is mounted on the rim in circumscribing relation to the webs 97. Initially, of course, the heads rest on the upwardly disposed portion of the band 110.

The screw 129 is turned to adjust the predetermined pressure at the tire duct 125 of the regulator 122 to that desired for proper inflation of the tire. The valve 143 is adjusted to its expand position so that the output 142 of the pump is connected through the valve to the supply hose 136 and the port 145 of the valve is connected to the intake 141 of the pump. The pump is then energized to supply air under pressure to the tube 20. Air is thus introduced under pressure through the aligned air passage 23 and aperture 35 into the air cylinder 47 back of the piston 60. This slides the piston and thus the camming block 70 longitudinally along the sleeve 32. The camming surface 74 of the block urges the plungers 83 radially outwardly through the guides 80. The air pressure in the ram 46 forces the camming block into engagement with one of the stops 45 whereupon further motion of the block ceases. As long as air pressure remains in the cylinder, however, the block remains in its extended position. Accordingly, the plungers are held in their outwardly extended positions and move the rim segments 96 into their expanded positions.

Expansion of the rim 95 moves the band 110 into circumferential airtight engagement with the beads 151 of the tire 150. Simultaneously with expansion of the rim, air travels through the passage 23 between the tube 20 and the sleeve 32, out through the perforation 36, through the conduit 128 and into the regulator 122. The regulator reduces the pressure to a predetermined level at the tire duct 125 and this air pressure is introduced into the tire through the hose 126 and the nipple 120. Inasmuch as the engagement of the band and the beads is airtight, air eventually fills the tire to the desired pressure where it is maintained by the regulator assuming continued operation of the pump. It is also to be observed that the air pressure internally of the tire further increases the engagement of the beads with the band as well as urging the beads outwardly into engagement with the flanges 98 and 102 of the rim 95. In commercial embodiments of the subject invention, the air pressure at the tire duct is maintained at approximately fifteen pounds per square inch while in the ram cylinder 47 this pressure is approximately ninety pounds per square inch. The invention is not limited to these pressures. They simply illustrate a suitable operational condition. When the tire is thus mounted and inflated, it is ready to be buffed, dressed, or otherwise surfaced by suitable well-known devices, not shown. For this purpose, the tire can be rotated around the tube 20 by means of the bearings 30 and 31.

To remove the tire 150 from the rim 95 a reverse procedure is followed. Thus, the valve 43 is moved into its contract position to connect the pump intake 141 to the supply hose 136 and to connect the atmosphere port 145 to the pump outlet 142. This withdraws air from the tube 20 and thus reduces the pressure in the cylinder 47 behind the piston 60 below atmospheric pressure. Inasmuch as the extended end of the cylinder is open to the atmosphere, pressure externally of the piston is greater than that inside of the cylinder behind the piston. This causes the piston and the camming block 70 to move into retracted position and allows the plungers 83 to slide inwardly to contract the rim 95. Simultaneously, air pressure in the conduit 128 leading to the regulator 122 is reduced to allow deflation of the tire. Of course, when the rim contracts, the airtight seal between the band and the tire is broken also to deflate the tire. When the rim is completely contracted, the tire can be removed, as will be apparent. Optionally, the retraction of the rim can be effected simply by bleeding the cylinder 47 to the atmosphere.

The brackets 100 are removable to enable attachment and removal of the band 110 for replacement or repair purposes. As explained in my prior copending application, the bridging plates 113 prevent inward movement or depression of the band 110 between the rim segments 96 in their expanded positions so as to maintain complete circumferential contact between the beads and the band. Additionally, upon contraction, the plates avoid pinching of the band between the rim segments.

Although positive retraction of the camming block 70 has been illustrated and described, conventional embodiments of the subject invention have successfully effected such contraction simply by taking advantage of the resilience of the band 110. Inasmuch as the band yieldably resists expansion of the rim 95, it will be evident that upon release of air pressure behind the piston 60, the band naturally tends to urge the plungers 83 inwardly and to force the block and thus the piston into retracted position.

From the foregoing, it will be evident that an effective, dependable, quick-acting apparatus has been provided for simultaneously mounting and inflating a tubeless tire in a work position. The apparatus is significant because it enables automatic expansion of the rim for mounting the tire as well as automatic inflation of the tire.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a tire mounting apparatus, a plurality of arcuate rim segments adapted to receive a tire in circumscribing relation thereon, means mounting the rim segments in circular arrangement for corresponding radially inwardly and outwardly adjustable movement, air sealing means circumscribing the rim segments disposed for airtight engagement with the beads of tires mounted in circumscribing relation on the segments, controlled power means for moving the segments correspondingly inwardly and outwardly, a pneumatic system having a conduit ported through the sealing means, and means interconnecting the pneumatic system and the power means for concurrent operation thereby to supply air under pressure through the conduit to the interior of a tire mounted on the rim segments concurrently with outward movement of the rim segments and to emit air through the conduit from the interior of such a tire concurrently with movement of the rim segments inwardly.

2. In a tire mounting apparatus, a plurality of arcuate rim segments, means mounting the rim segments concentrically about a predetermined axis for corresponding radially inwardly and outwardly adjustable movement and for receiving a tire in circumscribing relation thereon, air sealing means circumscribing the rim segments and disposed for airtight engagement with such a tire, pneumatic means for correspondingly moving the rim segments inwardly and outwardly while maintaining the segments concentrically about the axis, and a pneumatic system connected to the pneumatic means and supplied with air under pressure therefrom, said system having a conduit ported through the sealing means through which air is forced concurrently with outward movement of the rim segments and through which air is permitted to escape concurrently with inward movement of the rim segments.

3. The apparatus of claim 2 wherein the segments have opposite ends in adjacent relation, wherein the sealing means has inwardly and outwardly disposed surfaces, and including bridging plates secured to the inwardly disposed surface of the band in slidable spanning engagement between adjacent ends of adjacent segments.

4. In combination with an expansible rim circumscribing a predetermined axis and having a plurality of separable arcuate segments adapted for reciprocal movement radially of said axis between expanded and retracted positions, and an endless annular elastic band circumscribing the segments and yieldably urging the segments into said retracted positions; an apparatus for expanding the segments comprising an elongated substantially cylindrical support member substantially coaxial with said predetermined axis; a ram including a cylinder concentrically mounted in space circumscribing relation on the support member and a reciprocating piston slidably mounted on the support member for longitudinal movement within the cylinder between extended and retracted positions; a plurality of substantially equally spaced, radially extended, tubular guides mounted in the cylinder; plungers including rods individually slidably fitted in the guides having outer ends rigidly individually connected to the rim segments and inner ends, and rollers rotatably mounted on the inner ends of the rods for rotation in planes radially related to said predetermined axis; a camming block mounted for longitudinal slidable movement on the support member having an end connected to the piston and an outer frusto-conical camming surface concentric to said axis engaging the rollers; and means for introducing fluid under pressure into the cylinder of the ram for moving the piston into its extended position thereby to slide the block longitudinally of the support member and move the plungers radially outwardly and for releasing such fluid pressure for allowing the piston to retract, said elastic band being adapted to force the plungers against the block to urge the piston into retracted position upon release of said fluid pressure.

5. An apparatus for simultaneously inflating a tubeless tire having annular beads and for mounting the tire in a work position comprising a support, an elongated tube having a support end rigidly mounted in the support, an outwardly extended end, and a radial fluid passage adjacent to the support end; an elongated substantially cylindrical sleeve rotatably mounted in concentric circumferentially spaced relation on the tube having a support end adjacent to the support end of the tube, an outwardly extended end adjacent to the extended end of the tube, a radially disposed aperture adjacent to the fluid passage, and a radially disposed perforation adjacent to said extended end; an air cylinder concentrically mounted in circumferentially spaced circumscribing relation on the sleeve having a closed end adjacent to said support ends and an oppositely extended open end, said passage and aperture providing fluid communication between the interiors of the tube, the sleeve, and the cylinder; a piston slidably mounted on the sleeve for longitudinal slidable movement therealong and within the cylinder between extended and retracted positions; an annular stop secured in circumscribing relation to the sleeve adjacent to its extended end; a camming block slidably mounted on the sleeve having an end of maximum diameter connected to the piston and an external frusto-conical camming surface tapered from said end of maximum diameter toward the extended end of the sleeve to an end of minimum diameter and being movable with the piston between an extended position abutting the stop and a retracted position longitudinally spaced from the stop; a plurality of tubular guides mounted in substantially equally spaced, radially extended positions in the cylinder; plungers including rods individually slidably fitted in the guides having inner and outer ends, and rollers rotatably mounted on the inner ends of the rods for rotation in planes radially related to said axis and engaging the camming surface of the block whereby the rods are moved inwardly and outwardly of the sleeve upon longitudinal slidable movement of the block between its extended and retracted positions; a plurality of arcuate rim segments individually secured to the outer ends of the rods in circumscribing concentric relation to said axis and being movable incident to movement of the rods between retracted and expanded rim forming positions; an endless annular elastic band circumscribing the rim segments and yieldably urging the segments into their retracted positions, said rim segments being adapted to receive a tubeless tire therearound with the beads of the tire in engagement with the band; air conducting means having an end connected to said perforation in the sleeve and an end extended through one of the rim segments and the band for providing air communication between the interior of a tire mounted on the rim segments and the sleeve; and means for introducing air into the tube for travel through said passage in the tube into the sleeve and through said aperture into the cylinder thereby to inflate a tire mounted on the rim segments simultaneously with movement of the piston into extended position, and for releasing air from the tube simultaneously to enable the piston to retract and to release air from the tire.

6. In an apparatus for mounting an annular inflatable member having a hollow interior, a plurality of rim segments having opposite ends, means mounting the segments in end-to-end rim-forming relation circumscribing a predetermined axis for corresponding adjustable movement of the segments inwardly and outwardly with respect to the axis, the segments being adapted to receive such an annular inflatable member in circumscribing relation thereon, an annular elastic band circumscribing the rim segments and disposed for airtight engagement with such an annular inflatable member circumscribing the segments, controlled power means for moving the segments correspondingly inwardly and outwardly, a pneumatic system having a conduit ported through the band, and means interconnecting the power means and the pneumatic system automatically to supply air under pressure through the conduit to the interior of the inflatable member mounted on the rim segments concurrently with outward movement of the rim segments and to emit air through the conduit from the interior of such an inflatable member concurrently with movement of the rim segments inwardly.

7. In a tire mounting apparatus, a plurality of arcuate rim segments adapted to receive a tire in circumscribing relation thereon, means mounting the rim segments in circular arrangement for corresponding radially inwardly and outwardly adjustable movement, air sealing means circumscribing the rim segments disposed for air tight engagement with the beads of tires mounted in circumscribing relation on the segments, controlled power means for moving the segments correspondingly inwardly and outwardly, and a pneumatic system having a conduit ported through the sealing means operably associated with the power means to supply air under pressure through the conduit to the interior of a tire mounted on the rim segments concurrently with outward movement of the rim segments to emit air through the conduit from the interior of such a tire concurrently with movement of the rim segments inwardly, said mounting and power means including a support, an elongated tube rigidly mounted in the support, an elongated sleeve concentrically journaled on the tube in circumferentially spaced relation thereto so as to define an annular air passage therebetween, an air cylinder rigidly concentrically mounted on the sleeve, an annular piston slidably mounted on the sleeve for reciprocal movement within the cylinder, a plurality of tubular guides rigidly mounted in the cylinder and radially outwardly extended therefrom in circumferentially spaced relation, elongated plunger rods individually radially slidably fitted in the guides having inner ends within the cylinder and outer ends rigidly connected individually to the segments, an annular tapered camming block mounted on the sleeve in engagement with the piston for longitudinal slidable movement therealong incident to reciprocation of the piston and engaging the inner ends of the rods for moving the segments radially inwardly and outwardly, the tube having an air passage communicating with said annular passage, the sleeve having an aperture providing communication between the passageway and the cylinder, and said conduit being connected to the sleeve whereby upon introduction of air under pressure into the tube, air is delivered through the conduit to the interior of the tire and through the air passage and aperture into the cylinder for concurrently moving the segments outwardly and inflating the tire and whereby upon release of air pressure from the tube, air is emitted from the interior of the tire through the conduit into the sleeve and tube and from the cylinder through the aperture and the passage into the tube.

8. In an apparatus for simultaneously inflating a tubeless tire having a hollow interior and annular beads and for mounting a tire in a work position comprising a support, an elongated tube rigidly mounted in the support; an elongated sleeve mounted in spaced circumscribing relation on the tube; an air cylinder mounted in circumscribing relation on the sleeve, said tube and sleeve having ports to provide communication between the interiors of the tube, the sleeve, and the cylinder; an annular piston slidably mounted on the sleeve for longitudinal slidable movement therealong within the cylinder between extended and retracted positions; a plurality of arcuate rim segments; means operably interconnecting the rim segments and the piston and mounting the segments in circumscribing relation to the sleeve for corresponding radially inwardly and outwardly adjustable movement incident to extension and retraction of the piston and for receiving a tire in circumscribing relation thereon; an annular elastic band circumscribing the rim segments and yieldably urging the segments inwardly toward the sleeve; air conducting means having an end connected to said sleeve and an opposite end communicating through one of the rim segments and the band for providing air passages between the interior of a tire mounted on the rim segments and the sleeve whereby upon introduction of air under pressure into the tube, said piston is extended and said tire is inflated and whereby when said air pressure is relieved, air is returned from the tire and cylinder to the tube and the band retracts the piston.

9. An apparatus for simultaneously inflating a tubeless tire having a hollow interior and annular beads and for mounting the tire in a work position comprising a support, an elongated tube having a support end rigidly mounted in the support, an outwardly extended end, and a radial passage adjacent to the support end; an elongated sleeve circumscribing the tube having a support end mounted in the support adjacent to the support end of the tube, an outwardly extended end adjacent to the extended end of the tube, a radially disposed aperture adjacent to the passage in the tube, and a radially disposed perforation adjacent to said extended end; an air cylinder mounted in circumscribing relation on the sleeve having a closed end adjacent to said support ends and an oppositely extended open end, said passage and aperture providing fluid communication between the interiors of the tube, the sleeve, and the cylinder; an annular piston slidably mounted on the sleeve for longitudinal slidable movement therealong within the cylinder between extended and retracted positions; a plurality of arcuate rim segments; means operably interconnecting the rim segments and the piston, and mounting the segments in circumscribing relation to the sleeve for corresponding radially inwardly and outwardly adjustable movement incident to extension and retraction of the piston and for receiving a tire in circumscribing relation thereon; an annular elastic band circumscribing the rim segments and yieldably urging the segments inwardly toward the sleeve; air conducting means having an end connected to said perforation and an opposite end extended through one of the rim segments and the band for providing air communication between the interior of a tire mounted on the rim segments and the sleeve; and means for introducing air into the tube for travel through said passage into the sleeve and through said aperture into the cylinder thereby to inflate a tire mounted on the rim segment simultaneously with movement of the segments upwardly from the sleeve and for releasing air from the tire simultaneously with movement of the segments inwardly toward the sleeve.

10. In combination with an expansible rim circumscribing a predetermined axis and having a plurality of separable segments, means mounting the segments for reciprocal movement radially of said axis between expanded and retracted positions, and an endless annular elastic band circumscribing the segments and yieldably urging the segments into said retracted positions; an apparatus for expanding the segments comprising an elongated support member radially inwardly spaced from the rim segments; a ram including a cylinder mounted on the support member in spaced circumscribing relation to the support member and a reciprocation annular piston slidably mounted on the support member for longitudinal movement within the cylinder between extended and retracted positions; a plurality of substantially radially extended, tubular guides mounted in the cylinder; plungers individually fitted in the guides having outer ends rigidly individually connected to the rim segments and inner ends extending into the cylinder; an annular camming block mounted for longitudinal slidable movement on the support member connected to the piston and providing an endwardly tapered camming surface circumscribing said axis and engaging the inner ends of the plungers; and means for introducing fluid under pressure into the cylinder of the ram for moving the piston into its extended position thereby to slide the block longitudinally of the support member and to move the plungers radially outwardly and for releasing such fluid pressure for allowing the piston to retract, said elastic band being adapted to force the plungers against the block and to urge the piston into retracted position upon release of said fluid pressure.

11. In a tire mounting apparatus; a support; an annular expansible means mounted on the support including an annular, air impervious tire mounting portion substantially concentric to a predetermined axis and being adapted to receive a tire having annular beads in circumscribing air sealing engagement thereon, the tire mounting portion having a port opening therethrough, said expansible means also including a pair of axially spaced, annular flanges radially outwardly extended from the tire mounting portion on opposite sides of the port for air sealing engagement by the beads of such a tire upon movement of the beads axially outwardly against the flanges incident to inflation of the tire, said tire mounting portion and flanges being diametrically expansible and contractible outwardly and inwardly with respect to said axis between an expanded position in sealing engagement with such a tire and a contracted position; means connected to the tire mounting portion for urging said portion and flanges into said expanded position; and a pneumatic system connected to said urging means for expanding the mounting portion and flanges into said expanded position, said pneumatic system also including an air conduit connected to the port for simultaneously inflating such a tire while moving the mounting portion and the flanges into said expanded positions.

12. In a tire mounting apparatus, a plurality of arcuate rim segments adapted to receive a tire in circumscribing relation thereon, means mounting the rim segments in circular arrangement for corresponding radially inwardly and outwardly adjustable movement, air sealing means circumscribing the rim segments disposed for air-tight engagement with the beads of tires mounted in circumscribing relation on the segments, controlled power means for moving the segments correspondingly inwardly and outwardly, a pneumatic system having a conduit ported through the sealing means, and means interconnecting the pneumatic system and the power means for synchronous operation whereby air is supplied under pressure through the conduit to the interior of a tire mounted on the rim segments and air is emitted through the conduit from such tire in predetermined timed relation to the outward and inward movement of the rim segments respectively.

References Cited in the file of this patent

UNITED STATES PATENTS

| | | |
|---|---|---|
| 518,112 | Moore | Apr. 10, 1894 |
| 766,194 | Ornstien | Aug. 2, 1904 |
| 1,060,477 | Meyers | Apr. 29, 1913 |
| 1,270,380 | Converse | June 25, 1918 |
| 1,777,405 | Frank | Oct. 7, 1930 |
| 2,260,662 | Farrell | Oct. 28, 1941 |
| 2,399,572 | Powell et al. | Apr. 30, 1946 |
| 2,514,964 | Miller et al. | July 11, 1950 |
| 2,694,247 | Rose | Nov. 16, 1954 |

FOREIGN PATENTS

| | | |
|---|---|---|
| 1,130,534 | France | Feb. 6, 1957 |